Aug. 16, 1927.
M. R. SHIPLEY
JOINT FOR STOVEPIPE CASINGS
Filed Sept. 20, 1924
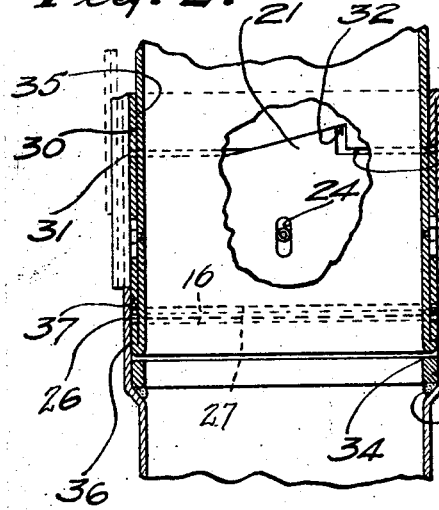
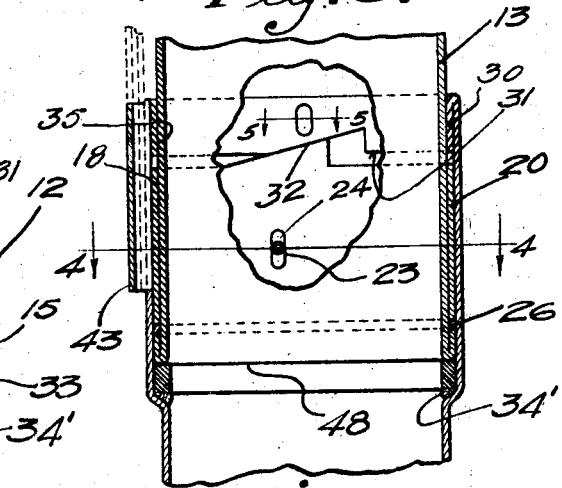
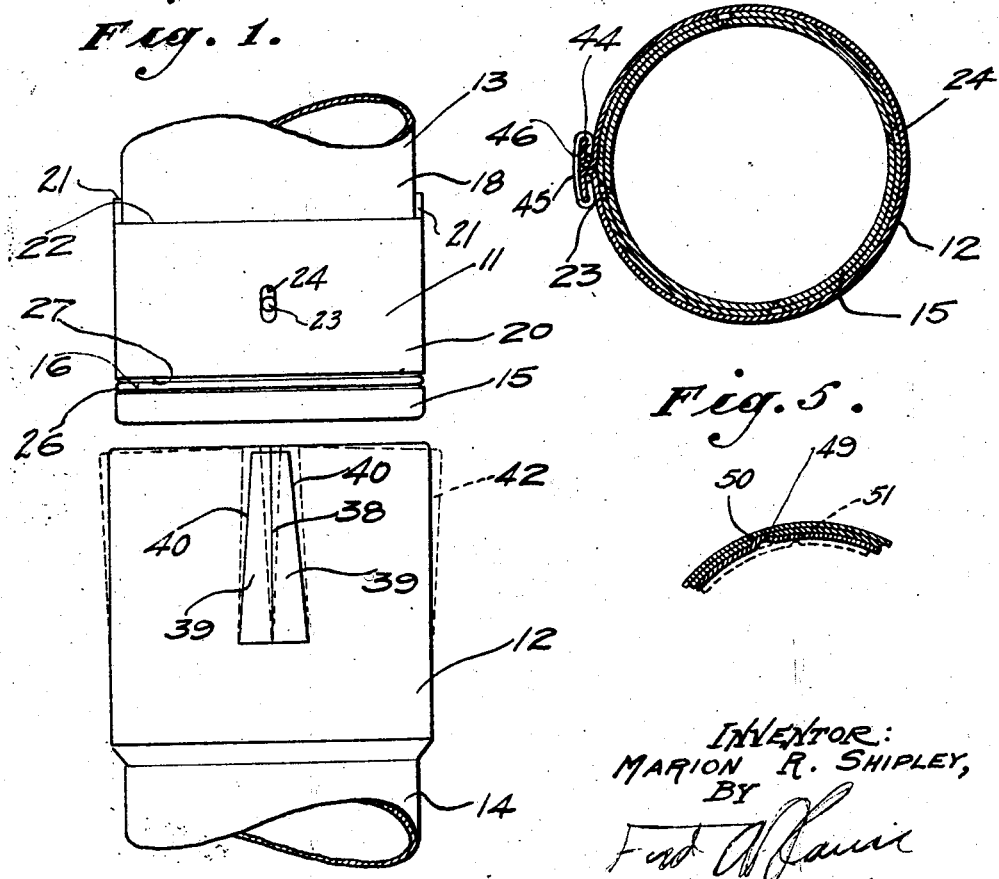
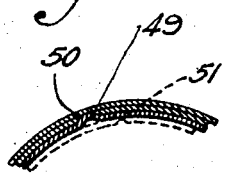

Patented Aug. 16, 1927.

1,639,315

UNITED STATES PATENT OFFICE.

MARION R. SHIPLEY, OF MANHATTAN BEACH, CALIFORNIA.

JOINT FOR STOVEPIPE CASINGS.

Application filed September 20, 1924. Serial No. 738,887.

This invention relates to pipe and casing, and it relates particularly to a joint construction therefor.

My invention is very useful when employed for joining well casing, such as is used in the oil producing industry. In this industry, as an oil well is sunk, a well casing is advanced downwardly into the well to prevent caving in of the walls, excluding ground water and for other reasons. Ordinary screw casing is commonly used for this purpose. In an endeavor to reduce both the initial expense of the screw casing and cost of installation thereof, stovepipe casing has been substituted therefor in many wells. Stovepipe casing, so called in the oil industry, is made up from flat sheets of metal rolled and secured together in sections to form a continuous pipe. It is usually made of two concentric sheets. Stovepipe casing is found to be superior to the screw casing in many cases, but it has been found difficult to economically make a fluidtight joint between the sections.

It is an object of this invention to provide a joint adaptable to stovepipe casing which will provide an extremely reliable fluidtight joint.

It is a further object of the invention to provide a joint construction which will be very economical to make.

It is a still further object of the invention to provide a joint of the class described which can be rapidly assembled.

It is also an object of the invention to provide a joint which may be very easily broken, if desired.

Other objects and the specific advantages of the invention will be made evident hereinafter.

Referring to the drawings, which are for illustrative purposes only,

Fig. 1 is a view showing the male and female members of the joint in a position ready to be assembled.

Fig. 2 is a sectional view showing the male member inserted into the female member.

Fig. 3 is a section similar to Fig. 2, but showing the members in the locking position.

Fig. 4 is a section taken substantially as indicated by the line 4—4 of Fig. 3.

Fig. 5 is a section taken substantially as indicated by the line 5—5 of Fig. 3.

As shown in the drawings and particularly in Fig. 1, my invention is provided in the form of a male portion 11 and a female portion 12, these portions being formed at the ends of casings 13 and 14, respectively. The extreme end of the casing 13 is bent back upon itself, so as to provide an exterior lip 15 which provides an annular shoulder 16. Movably disposed on the cylindrical face 18 of the end of the casing 13, which comprises the male member 11, is a compressing member which is in the form of a sleeve 20, having cam portions 21 provided on the upper face 22 thereof. The compressing member 20 is rendered relatively movable to the casing 13 in an axial direction only by means of pins 23 which are riveted to the casing 13, as shown, these pins extending into axial extending slots 24 provided in the sleeve 20. An annular packing member 26 is provided which rests near the end of the casing 13 between the shoulder 16 of the lip 15 and the lower annular face 27 of the compressing member 20.

The female portion of the joint is provided by flaring the extreme end of the casing 14, as indicated at 42, and by bending the extreme end thereof back upon itself in a manner to provide an interior retaining lip 30, having an annular interior retaining face 31. The face 31 is provided with cam faces 32 which are arranged to engage with the cam portions 21 of the male member 11 when the members are assembled. At the lower end of and inside the female member 12, there is secured an abutting ring 33 which provides an annular abutting face 34, this ring being secured in place, such as by welding 34', as shown in Figs. 2 and 3.

From the drawings it will be seen that the inner face 35 of the retaining lip 30 is slightly larger than the cylindrical face 18 of the portion 11 and that the outer face 36 of the lip 15 is of a size slightly smaller than the inner face 37 of the portion or member 12. To permit the inserting of the portion 11 into the portion 12 past the retaining lip 30, I provide the portion 12 with an opening seam 38, as shown, the wall of the portion 12 at this point being bent outwardly and in opposite directions so as to form wings 39 having converging faces 40. It will be seen that to allow the lip 15 and the compressing member 20 to pass the retaining lip 30 of the member 12, it is necessary to provide a means for allowing the expanding of the member 12, this being accomplished by the provision of the open seam 38.

The assembling of the joint is substantially as follows:

The male and female portions 11 and 12 are first positioned as shown in Fig. 1. The portion 12 is then expanded in a suitable manner as indicated by the dotted lines 42 of Fig. 1. The portion 11 is then extended into the portion 12, as shown in Fig. 2, after which the portion 12 is allowed to return to its original position. A clamping member 43, as shown in Figs. 3 and 4, having converging faces 44 for engagement with the faces 40 of the wings 39, provided by the web 45 and lips 46, is partially installed upon the wings 39 so as to partially constrict the member 12. The casing 13 is then rotated from the position shown in Fig. 2 into the position shown in Fig. 3. When this occurs, it will be seen that the cam portions 21 ride along the cam faces 32 of the retaining lip 30 and force the compressing member downwardly in an axial direction relative to the female portion 12. It will be seen that the lower face 48 of the portion 11 will be brought into engagement with the abutment face 34 of the abutment ring 33. After this engagement, a relative axial movement between the compressing member 20 and the casing 13 serves to tightly compress the packing member 26, this serving to force the packing member 26 very securely against the inner wall 37 of the portion 12, and the outer wall 18 of the portion 13. The clamp 43 is then completely installed, as shown in Fig. 3, which compresses the inner face 35 of the retaining lip 30 and the inner face 37 of the portion 12 tightly against the exterior faces of the portion 11 which tends to lock them securely against rotation.

As an additional precaution against a possible rotation between the portions 11 and 12, I provide a locking means which is clearly shown in Fig. 5. The casing 13 is provided with a depressed hump 49 and the retaining lip 30 of the portion 12 is provided with a recess 50. When the parts are assembled as shown in Fig. 2, the depressed hump 49 rests, as shown at 51 in Fig. 5, it being forced inwardly due to its engagement with the interior face 35 of the lip 30. When the portions 11 and 12 are rotated into sealing or locking position, as shown in Fig. 3, the depressed portion is moved leftwardly into the position shown, and at this time extends into the recess 50 provided in the retaining pipe 30.

From the foregoing description, it will readily be seen that a joint of this character very effectively provides a reliable fluidtight joint. It will be seen that the packing member 26 is very forcefully brought into contact with the interior face of the member 12, and with the exterior face of the member 11. As seen from the drawings, the open seam 38 extends to a point above the packing 26, and therefore does not affect the joint. By providing the clamp member 43, as shown, it is possible to very rigidly constrict the outer end of the portion 12 around the portion 11. The joint shown in the drawings is comparatively economical to produce. It may be very easily and rapidly assembled, as will be seen from the description, and may be very conveniently broken, as it will be seen that by first removing the clamp 43, the locking between the depression 49 and the recess 50 is released.

I claim as my invention:

1. A joint comprising: a tubular member having a female portion formed on the end thereof; a tubular member having a male portion formed at the end thereof, said male portion being arranged for insertion into said female portion without rotation of either portion; a packing member arranged to form a tight seal between said male and female portions when compressed; and means movable relative to and actuated by a relative rotation between said male and female portions for compressing said packing member axially and radially.

2. A joint comprising: a tubular member having a female portion formed on the end thereof; a tubular member having a male portion formed at the end thereof, said male portion being arranged for complete insertion into said female portion without relative rotation thereof; a packing member arranged to form a tight seal between said male and female portions when compressed; and a compressing member arranged for compressing said packing member, said compressing member being operated relative to both tubular members to compress said packing member axially and radially by a relative rotation between said male and female portions.

3. A joint comprising: a female member; a male member, said male member being adapted for complete insertion into said female member without relative rotation thereof; a packing member on said male member; and a compressing member carried by and movable relative to said male member, said compressing member being arranged to compress said packing member axially and radially in a manner to form a seal between said male and female members and said compressing member being arranged to be actuated by a relative rotation between said male and female members.

4. A joint comprising: a female member; a male member, said male member being adapted for insertion into said female member; a packing member on said male member; and a compressing member carried by said male member, said compressing member being arranged to compress said packing member in a manner to form a seal between said male and female members, and said compressing member being arranged to be actuated by a relative rotation between said male and female members and to move axially on said male member to compress said packing member.

5. A joint comprising: a female member; a male member, said male member being adapted for insertion into said female member; a retaining lip provided at the outer end of said female member for retaining said male member therein; a packing member on said male member; and a compressing member carried by and movable relative to said male member, said compressing member being arranged to compress said packing member axially and radially in a manner to form a seal between said male and female members, and said compressing member being arranged to be actuated by a relative rotation between said male and female members.

6. A joint comprising: a male member; a female member adapted to receive said male member, said female member being provided with an open seam to permit an expansion thereof in order to allow the entrance of said male member; a retaining lip provided at the end of said female member for retaining said male member therein; a packing member on said male member; and a compressing member carried by said male member, said compressing member being arranged to compress said packing member in a manner to form a seal between said male and female members, and said compressing member being arranged to be actuated by a relative rotation between said male and female members.

7. A joint comprising: a male member; a female member adapted to receive said male member, said female member being provided with an open seam to permit an expansion thereof in order to allow the entrance of said male member; a retaining lip provided at the end of said female member for retaining said male member therein; a packing member on said male member; a compressing member carried by said male member, said compressing member being arranged to compress said packing member in a manner to form a seal between said male and female members; and means for clamping said female member around said male member.

8. A joint comprising: a female member; a male member, said male member being adapted for insertion into said female member; a retaining lip provided at the outer end of said female member for retaining said male member therein; a packing member on said male member; a compressing member carried by and movable relative to said male member; cam faces formed on said retaining lip; and cam formations formed on said compressing member, said cam formations being adapted to engage with said cam faces, said cam formations riding along said cam faces when a relative rotation between said male and said female members occurs, in a manner to move said compressing member and compress said packing member axially and radially.

9. A joint comprising: a female member; a male member, said male member being adapted for insertion into said female member; a retaining lip provided at the outer end of said female member for retaining said male member therein; a packing member on said male member; a compressing member carried by said male member; cam faces formed on said retaining lip; cam formations formed on said compressing member, said cam formations being adapted to engage with said cam faces, said cam formations riding along said cam faces when a relative rotation between said male and said female members occurs, in a manner to move said compressing member and compress said packing member; and means permitting a relative movement between said male member and said compressing member in an axial direction only.

10. A joint comprising: a female member; a male member, said male member being adapted for insertion into said female member; a retaining lip provided at the outer end of said female member for retaining said male member therein; a packing member on said male member; a compressing member carried by and movable relative to said male member; cam faces formed on said retaining lip; cam formations formed on said compressing member, said cam formations being adapted to engage with said cam faces, said cam formations riding along said cam faces when a relative rotation between said male and said female members occurs, in a manner to move said compressing member and compress said packing member axially and radially; and means for locking said male and female members in rotated position.

11. A joint comprising: a female member; a male member, said male member being adapted for insertion into said female member; a retaining lip provided at the outer end of said female member for retaining said male member therein; a packing member on said male member; a compressing member carried by said male member; cam faces formed on said retaining lip; cam formations formed on said compressing member, said cam formations being adapted to engage with said cam faces, said cam formations riding along said cam faces when a relative rotation between said male and said female members occurs, in a manner to move said compressing member and compress said packing member; means permitting a relative movement between said male member and said compressing member in an axial direction only; and means for locking said male and female members in rotated position.

12. A joint comprising: a male member having an exterior lip formed at the end thereof; a female member having a retaining lip, said female member being capable of expansion to allow an entrance of said male member; web wings formed on said female member; and a clamp member adapted to engage said web wings in a manner to clamp said female member tightly around said male member.

In testimony whereof, I have hereunto set my hand at Los Angeles, California, this 15th day of September, 1924.

MARION R. SHIPLEY.